United States Patent Office 2,772,991
Patented Dec. 4, 1956

2,772,991

PROCESS OF CLEANING A RESIDUAL POWDER IMAGE FROM AN ELECTROPHOTOGRAPHIC PLATE

Michael A. Insalaco, Rochester, N. Y., assignor to The Haloid Company, Rochester, N. Y., a corporation of New York No Drawing. Application December 14, 1954,
Serial No. 475,304

10 Claims. (Cl. 134—7)

This invention relates generally to electrophotographic techniques, and more particularly to improved cleaner materials for removing residual electroscopic powder from an electrophotographic plate after an electroscopic powder image has been transferred to a transfer medium.

An electrophotographic plate is produced by coating a metal plate with a suitable photo-conductive insulating layer, such as anthracene sulphur or the like, which is rendered conductive when exposed to light. In the electrophotographic process, the coated plate is first electrostaticaly charged and then exposed to the subject to be reproduced, whereby a latent image is formed on the sensitive layer. This latent image is developed by dusting the layer with an electroscopic powder. The powder image thus formed is transferred to a paper sheet or other transfer medium and affixed thereto by fusing.

Upon completion of these steps it becomes necessary to clean the electrophotographic plate thoroughly to remove therefrom any residual powder so as to prepare the plate for another electrostatic charge and exposure. To this end it is conventional to provide a cleaning powder and to cause this powder to pass back and forth across the electrophotographic plate, this being accomplished by a rocking or oscillatory motion of the plate.

Among the drawbacks attending the use of cleaners heretofore known are the following: some cleaners adversely affect the photo-conductive layer of the plate, others create an unpleasant dustiness when in use in a dry atmosphere, still others are toxic in nature and have a relatively brief effective life.

Accordingly, it is the principal object of this invention to provide an improved cleaning powder for removing electroscopic powder from an electrophotographic plate, which cleaner is free from the drawbacks attending the use of known cleaners and possesses superior cleaning characteristics.

More particularly, it is the object of the invention to provide a cleaner having the correct triboelectric relation to the toner particles, and which removes electroscopic powder from the electrophotographic plate effectively in the course of a limited number of passes and with a minimum of dustiness in a dry atmosphere. A cleaner in accordance with the invention is non-hygroscopic and non-toxic in nature; it is inert with respect to the selenium surface of the plate and neither abrades the plate nor deposits an oil film thereon.

It is also an object of the invention to provide a free flowing cleaner material having a large surface absorption, hence a relatively long life, which material may be manufactured at low cost.

In accordance with the invention the cleaner is composed of barium sulphate particles mixed with a metaphosphate salt, preferably zinc or aluminum metaphosphate.

The barium sulphate is of such purity as to be free of barium chloride or other soluble barium salts and is in a particle size averaging between 1 to 4 microns. The presence of chloride impurity may cause the selenium layer on the electrophotographic plate to crystallize to the grey or non-conductive form; hence, it is important that the barium sulphate be free of such impurity.

In one example, zinc metaphosphate $Zn(PO_3)_2$ is supplied to the mixture in a particle size which is not so fine as to set up a dust when in use, and not so coarse as to render the mixture gritty. It is found that zinc metaphosphate in particle sizes wherein about 98% will pass through a 20 mesh screen and at least 80% through a 35 mesh screen is satisfactory for this purpose.

The tendency to dustiness is further controlled by having a slight quantity of free phosphoric acid ($H_3PO_4$) in the cleaner. Preferably, the free phosphoric acid is in a range extending from at least ½% thereof, based on the weight of the zinc metaphosphate, to not more than 1.2%. In excess of 1.2%, the addition of free phosphoric acid renders the mixture hygroscopic.

The preferred range of the constituencies in the mixture extends between three parts zinc metaphosphate to two parts of barium sulphate by weight, and one part zinc metaphosphate to one part barium sulphate by weight. As the barium sulphate is increased relative to the metaphosphate beyond the limit of the above noted range, a tendency to caking and smearing arises, whereas if the metaphosphate is increased there is a tendency to dustiness. Within the above noted range the cleaner fulfils all of the desired requirements.

The combination cleans well in a few passes (two to eight passes), depending on the nature of the toner and the life of the cleaner. In some instances a trace of electroscopic material may remain on the plate, but this trace is easily removed by a gentle brushing with cotton. The bulk offered by the barium sulphate makes is unnecessary to use such large quantities of phosphate whereby the cleaner becomes excessively heavy in the developer tray. The combination therefore is superior to the components alone in results, bulk, weight and freedom from dustiness. Equally beneficial results are obtained with the use of aluminum metaphosphate in lieu of the zinc metaphosphate in the combination.

While the invention has been described in connection with certain specific materials, it will be evident that modifications may be made in the cleaner without departing from the essential scope of the invention. It is intended therefore to cover in the appended claims to cover all such departures as fall within the true spirit of the invention.

What is claimed is:

1. The process of cleaning a residual powder image from an element comprising a photoconductive insulating layer on a conductive backing carrying such image, which process comprises passing across said photoconductive insulating surface a mixture of finely-divided barium sulfate and a water insoluble metaphosphate salt.

2. The process of cleaning a residual powder image from an element comprising a photoconductive insulating layer on a conductive backing carrying such image, which process comprises passing across said photoconductive insulating surface a mixture of barium sulphate and zinc metaphosphate in proportions wherein the mixture has a minimum of dustiness.

3. The process of cleaning a residual powder image from an element comprising a photoconductive insulating layer on a conductive backing carrying such image, which process comprises passing across said photoconductive insulating surface a mixture of barium sulphate and aluminum metaphosphate in proportions wherein the mixture has a minimum of dustiness.

4. The process of cleaning a residual powder image from an element comprising a photoconductive insulating layer on a conductive backing carrying such image, which process comprises passing across said photoconductive insulating surface a mixture of barium sulphate and zinc metaphosphate in proportions wherein the mixture has a minimum of dustiness, said mixture further including a relatively small quantity of free phosphoric acid.

5. The process of cleaning a residual powder image from an element comprising a photoconductive insulating layer on a conductive backing carrying such image, which process comprises passing across said photoconductive insulating surface a mixture of barium sulphate and zinc metaphosphate in proportions wherein the mixture has a minimum of dustiness, said mixture further including a quantity of from about ½% to about 1.2% of free phosphoric acid, based on the weight of the zinc metaphosphate.

6. The process of cleaning a residual powder image from an element comprising a photoconductive insulating layer on a conductive backing carrying such image, which process comprises passing across said photoconductive insulating surface a mixture of barium sulphate and aluminum metaphosphate in proportions wherein the mixture has a minimum of dustiness, said mixture further including a quantity of from about ½% to about 1.2% of free phosphoric acid, based on the weight of the aluminum metaphosphate.

7. The process of cleaning a residual powder image from an element comprising a photoconductive insulating layer on a conductive backing carrying such image, which process comprises passing across said photoconductive insulating surface a mixture of barium sulphate and zinc metaphosphate in relative proportions of from three parts of metaphosphate to two parts of barium sulphate by weight, to one part of metaphosphate to one part of barium sulphate.

8. The process of cleaning a residual powder image from an element comprising a photoconductive insulating layer on a conductive backing carrying such image, which process comprises passing across said photoconductive insulating surface a mixture of barium sulphate and zinc metaphosphate in relative proportions of from three parts of metaphosphate to two parts of barium sulphate by weight, to one part of metaphosphate to one part of barium sulphate, said zinc metaphosphate being in a particle size in which about 98% thereof will pass through a 20 mesh screen and at least 80% will pass through a 35 mesh screen.

9. The process of cleaning a residual powder image from an element comprising a photoconductive insulating layer on a conductive backing carrying such image, which process comprises passing across said photoconductive insulating surface a mixture of barium sulphate and zinc metaphosphate in relative proportions extending from three parts of metaphosphate to two parts of barium sulphate by weight, to one part of metaphosphate to one of barium sulphate, said zinc metaphosphate being in a particle size in which about 98% thereof will pass through a 20 mesh screen and at least 80% will pass through a 35 mesh screen, said mixture further including a quantity of free phosphoric acid of from about ½% to 1.2% thereof based on the weight of the metaphosphate.

10. The process of cleaning a residual powder image from an element comprising a photoconductive insulating layer on a conductive backing carrying such image, which process comprises passing across said photoconductive insulating surface a mixture of barium sulphate and aluminum metaphosphate in relative proportions extending from three parts of metaphosphate to two parts of barium sulphate by weight, to one part of metaphosphate to one part of barium sulphate, said aluminum metaphosphate being in a particle size in which about 98% thereof will pass through a 20 mesh screen and at least 80% will pass through a 35 mesh screen, said mixture further including a quantity of free phosphoric acid of from about ½% to 1.2% thereof based on the weight of the metaphosphate.

References Cited in the file of this patent

UNITED STATES PATENTS

| | | |
|---|---|---|
| 2,420,475 | Greger et al. | May 13, 1947 |
| 2,444,347 | Greger et al. | June 29, 1948 |
| 2,450,952 | Greger | Oct. 12, 1948 |
| 2,455,758 | Greger | Dec. 7, 1948 |
| 2,484,782 | Copley | Oct. 11, 1949 |